April 9, 1935.　　　A. H. WILSON　　　1,997,444
CLUTCH CONTROLLING DEVICE
Filed July 2, 1934　　　2 Sheets-Sheet 2
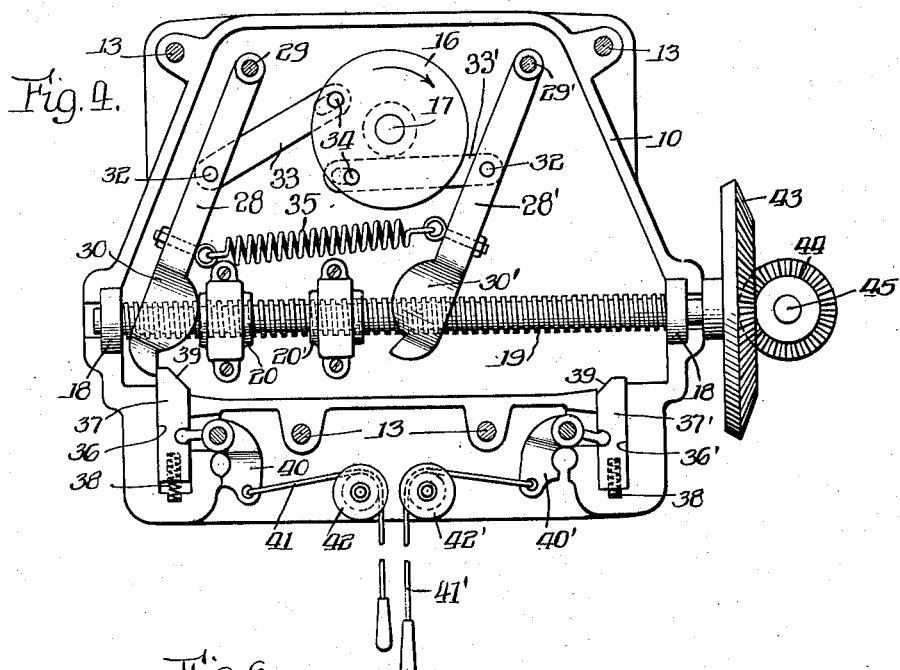
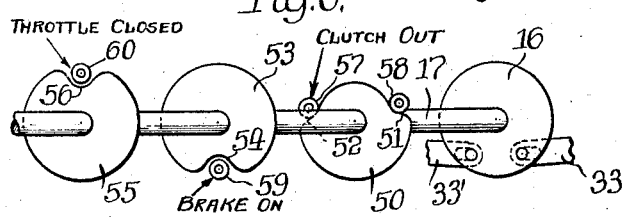
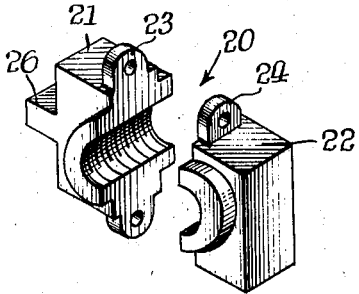
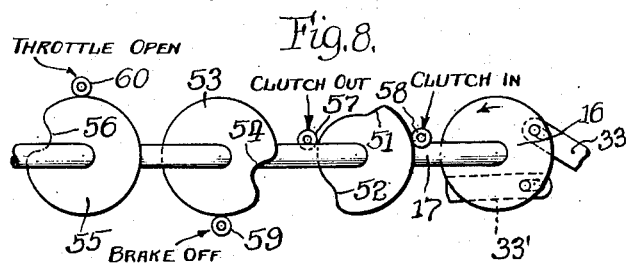
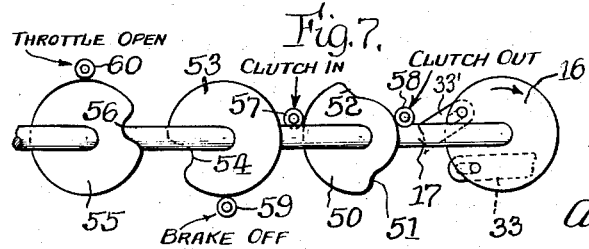
Inventor:
Alexander H. Wilson
By: Fisher, Clapp, Soans & Pond,
attys.

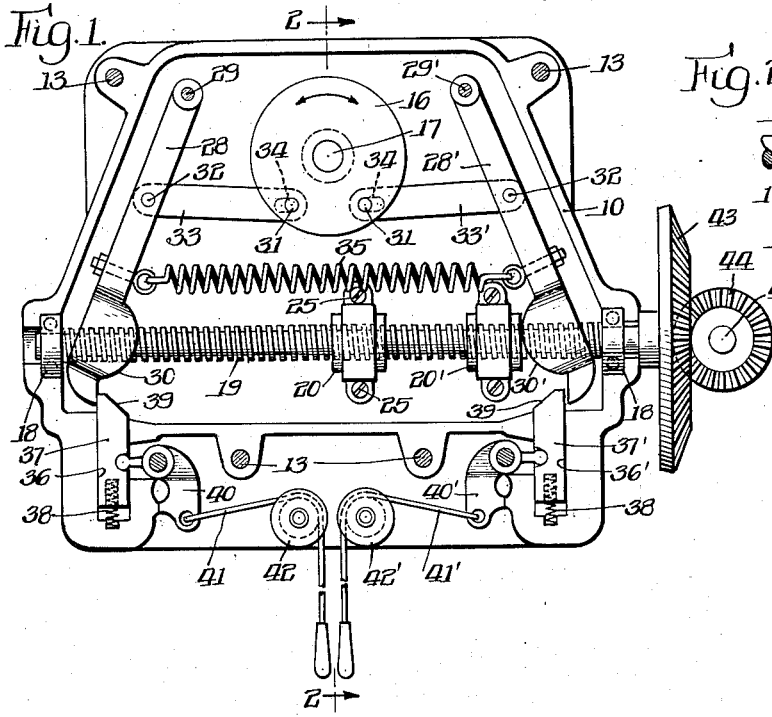

Patented Apr. 9, 1935

1,997,444

UNITED STATES PATENT OFFICE 1,997,444

CLUTCH CONTROLLING DEVICE

Alexander H. Wilson, Oak Park, Ill., assignor to Thomas Hoist Company, Chicago, Ill., a corporation of Illinois Application July 2, 1934, Serial No. 733,387

10 Claims. (Cl. 192—141)

This invention relates to clutch controlling devices designed chiefly for use on building material hoists, although capable of useful application in other situations employing clutches for applying and releasing motive power to and from parts to be driven, the invention having reference more particularly to clutch controls of that type wherein the clutch is engaged by automatic mechanism manually tripped into action, remains engaged through a predetermined cycle, and, at the end of the cycle, is automatically disengaged and locked in disengaged position until again tripped in. In the preferred form of the invention hereinafter described and shown in the annexed drawings the clutch control is double acting; that is, it controls a pair of movable clutch members that are alternately engaged to drive a shaft or hoisting drum first in one direction and then in the reverse direction, the control mechanism at the end of each cycle leaving both clutches in neutral or disengaged position. An important feature of the invention resides in a means incorporated in the control mechanism by which the time period through which the clutch remains active may be varied as desired or required, so as, for example in the case of hoisting mechanism, to raise the bucket or cage through one, two, three or more stories in height, and then automatically disengage the clutch and arrest further upward travel of the load. In its most complete form the control mechanism also includes a means for automatically applying a brake when the clutch is disengaged and releasing the brake when the clutch is engaged, and also a motor control whereby when the clutch is disengaged and the brake applied the motor is throttled down, and when the clutch is engaged and the brake released the motor throttle is opened.

A building material hoist of the type to which the present improvement may be applied is disclosed in my former Letters Patent No. 1,621,700, March 22, 1927. In the said patent the two clutches through which the hoisting cable drum is alternately rotated in opposite directions are thrown in manually from the point at which the material is being received and are automatically thrown out by strikers on the cages engaging buttons on a control cable connected to and operating a cam shaft by which the clutches are operated. In a hoisting equipment of this type, the device of the present invention eliminates the strikers, control cable and buttons as a means for disengaging the clutches when the cages have been raised to the point of delivery, and prevents accidental overthrow of the clutch such as occasionally occurs in high speed operation when employing the control cable and striker equipment.

One practical embodiment of the principle of the invention is illustrated in the accompanying drawings, in which—

Fig. 1 is a front elevation, with the cover member of the supporting frame or casing removed, showing the parts in a position corresponding to the neutral or disengaged position of both clutches.

Fig. 2 is a vertical section on the line 2—2 of Fig. 1.

Fig. 3 is a view similar to Fig. 1, but showing the position of the parts when the clutch for rotating the hoisting cable drum in one direction has been engaged.

Fig. 4 is a view similar to Fig. 1, but showing the position of the parts when the clutch for rotating the drum in the reverse direction has been engaged.

Fig. 5 is a perspective view of one of a pair of divided bodily adjustable nuts employed in the device.

Fig. 6 is a diagrammatic view of the rock-shaft, crank disc and cams, showing a position of the parts corresponding to Fig. 1.

Fig. 7 is a similar view of the same parts, showing a position of the parts corresponding to Fig. 3.

Fig. 8 is a similar view of the same parts, showing a position of the parts corresponding to Fig. 4.

Referring to the drawings, a supporting frame for the moving parts of the device is shown as a box or casing comprising a body section 10 and a cover 11. The body section and cover are provided at suitable points with registering apertures to receive machine screws 13 by which the frame may be secured to the frame of a hoisting machine, as indicated in Fig. 2.

The body 10 is formed with a bearing boss 14 in which is journaled the hub 15 of a peripherally slotted crank disc 16, said hub being keyed to a rock-shaft 17, the other end of said rock-shaft being journaled in any suitable support (not shown).

Journaled in anti-friction thrust bearings 18 in and crosswise of the supporting frame and at right angles to the cam shaft 17 is a screw 19, and on this screw 19 are a pair of traveling nuts 20 and 20'. Each of these nuts, as best shown in Fig. 5, is made in mating halves 21 and 22 formed with top and bottom lugs 23 and 24 apertured to receive machine screws or bolts 25 (Fig. 1) by which the two sections of the nut are clamped together on the screw. On the back of section 21 is a lug 26 that travels in a guide groove 27 on the back wall of the supporting frame to hold the nut against rotation, and it will be observed from Fig. 2 that there is sufficient clearance between the lug 26 and the bottom of the groove 27 to permit the section 21 of the nut to clear the screw when adjusting the nut to a new position on the screw. By reason of this construction the two nuts can be bodily adjusted to different distances apart on the screw to vary the length and time of travel of each nut before it acts to disengage a clutch, as hereinafter explained.

28 and 28' designate a pair of levers pivotally suspended at 29 and 29' from the back wall of the frame. The lower free ends of these levers are forked, as shown in Fig. 2, and straddle the screw 19, said forked ends being preferably formed with cheeks 30 and 30' to give line contact with the ends of the nuts.

In the crank disc 16 are mounted about 75 degrees apart a pair of crank pins 31, and pivoted to the levers 28 and 28' at 32 are a pair of links 33 and 33', the inner ends of which are formed with slots 34 providing lost-motion pivotal connection with the crank pins 31.

The two levers 28, 28' are connected preferably below the links 33, 33' by a pull spring 35.

Slidably mounted in vertical sockets 36 and 36' in the frame below the screw 19 are a pair of locking pins 37, 37', the upper ends of which normally project in the paths of the lower ends of the levers 28, 28' under the upward urge of springs 38 and are formed with cam inclines 39. On the outward swing of each lever under the thrust of one of the nuts, the lower rounded end of the lever cams down and passes slightly beyond the locking pin, whereupon the latter snaps upwardly to locking position, as shown at the right in Fig. 1. The pins 37, 37' are manually retracted by elbow levers 40 and 40' engaged with the pins as shown, said levers being actuated to retract the pins from locking position by cords 41 and 41' extending over suitably located guide pulleys such as 42 and extending to any desired operating position, such as the floor at which the material is being delivered.

Fast on one end of the screw 19 is a miter gear 43 engaged and driven by a miter pinion 44 fast on a shaft 45 which, in practice, may be the drum shaft of the hoisting machine, functionally similar to the drum shaft 28 of my aforesaid patent, or a shaft geared thereto.

Operation

Describing the operation in connection with the diagrammatic views, Figs. 6, 7 and 8, the rock-shaft 17, which corresponds functionally to the rock-shaft 57 of my aforesaid patent, has fast thereon, in addition to the crank disc 16, a clutch throw-in cam disc 50 formed with two cam shoulders 51 and 52 about 75 degrees apart, a brake-release cam disc 53 formed with a cam notch 54, and a throttle-opening cam disc 55 formed with a cam notch 56. In the positions illustrated in Figs. 1 and 6, the travelling nut 20' has just forced lever 28' past locking pin 37' and this at the end of a load hoisting operation, has shifted the cam rock-shaft 17 and the cams thereon to the neutral position shown in Fig. 6, in which both of the shiftable clutch members (which are thrown in by the shoulders 51 and 52 acting on followers 57 and 58) are disengaged or out under the action of clutch throw-out springs (not shown), the drum brake has been applied by a spring (not shown) by reason of a follower 59 on a brake-release arm dropping into the notch 54, and the motor throttle has been closed by a spring (not shown) by reason of a follower 60 on a throttle-opening arm dropping into the notch 56. To start the next loaded cage upwardly, the operator pulls the cord 41, which releases the lever 28, and the spring 35 instantly shifts the parts to the positions shown in Figs. 3 and 7, it being understood that the turning movement of rock-shaft 17 is limited by suitable stops to about 75 degrees from its central or neutral position. This, as shown in Fig. 7, throws in one clutch member which drives the hoisting drum in one direction, the other clutch member remaining out, releases the brake, and opens the motor throttle. As the loaded cage is hoisted, the screw 19 is rotated in a direction to feed the nut 20 to the left viewing Fig. 3, and as soon as nut 20 strikes lever 28 it gradually forces the latter outwardly past the locking pin 37, at the end of which movement the previously engaged clutch is disengaged, the brake is applied, the throttle is closed, and the parts are returned to the neutral positions shown in Figs. 1 and 6, except that the two nuts are then located on the left end portion of the screw. When the loaded cage has been emptied and the companion cage on the ground has been loaded, the operator pulls cord 41' which retracts locking pin 37', and, under the pull of spring 35, the parts instantly take the positions shown in Figs. 4 and 8. This, as shown in Fig. 8, throws in the other clutch member, which drives the hoisting drum in the reverse direction, the first-operated clutch member remaining out, releases the brake, and opens the motor throttle. As the second loaded cage is hoisted, the screw 19 is rotated in a direction to feed the nut 20' to the right viewing Fig. 4, and as soon as the nut 20' strikes lever 28' it gradually forces the latter outwardly past the locking pin 37', at the end of which movement the second clutch is disengaged, the brake is applied, the throttle is closed, and the parts are returned to the neutral positions shown in Figs. 1 and 6.

It will be seen that the length and time of travel of the lever actuating nut in each cycle determines the height to which the load is raised. Hence, by bodily adjusting the nuts closer together or farther apart, the length of travel of the cages may be increased or decreased, as the building conditions may require. It will also be observed that as each lever reaches its outermost position under the push of one of the nuts it automatically re-engages itself with its locking pin, so that it remains fixed in position against the pull of spring 35 until again released by the retraction of the locking pin.

This invention may be developed within the scope of the following claims without departing from its essential features, and the specification and drawings are to be read as merely illustrative and not in a limiting sense, except as necessitated by the prior art.

I claim:

1. In a clutch controlling device, the combination of a frame, a clutch-controlling shaft, a screw journaled in said frame, a non-rotatable traveling nut on said screw, a lever pivoted on said frame and extending across the path of said nut, an operating connection from said lever to said shaft, an actuating spring for said lever, said screw and nut operating said lever against the urge of said spring, a manually retractible lock for holding said lever against movement by said spring, and means for rotating said screw alternately in opposite directions.

2. In a clutch controlling device, the combination of a frame, a clutch-controlling shaft, a screw journaled in said frame at right angles to said shaft, a non-rotatable traveling nut on said screw, a lever pivoted at one end on said frame with its other end extending across the path of said nut, an operating connection from said lever to said shaft, a pull spring for said lever, said screw and nut operating said lever against the pull of said spring, a manually retractible lock for holding said lever against movement by said spring, and means for rotating said screw alternately in opposite directions.

3. In a clutch controlling device, the combination of a frame, a clutch-controlling rock-shaft, a screw journaled in said frame at right angles to said rock-shaft, a pair of non-rotatable traveling nuts on said screw, a pair of levers pivoted at one end on said frame on opposite sides respectively of said rock-shaft with their other ends extending across the paths of said nuts, operating connections from said levers to said rock-shaft, a pull spring connecting said levers and urging them toward each other, said screw and nuts operating said levers against the pull of said spring, manually retractible locks for holding said levers against movement by said spring, and means for rotating said screw alternately in opposite directions.

4. A specific embodiment of the subject-matter of claim 3, wherein said nuts are bodily adjustable to different distances apart on said screw.

5. A specific embodiment of the subject-matter of claim 3, wherein said nuts are formed in separably connected mating halves, and one of said halves is formed with a lug slidably engaged with a guide on said frame to hold the nut against rotation.

6. A specific embodiment of the subject-matter of claim 3, wherein said levers are suspended at their upper ends on said frame and their lower ends are forked to straddle said screw.

7. A specific embodiment of the subject-matter of claim 3, wherein said locks are spring-actuated to locking position in the paths of said levers and are cammed outwardly by said levers under the thrust of said nuts on said levers.

8. A specific embodiment of the subject-matter of claim 3, wherein said locks are spring-actuated to locking position in the paths of said levers and are formed with cams engaged by the free ends of said levers to retract them under the thrust of said nuts on said levers.

9. A specific embodiment of the subject-matter of claim 3, wherein the operating connections from the levers to the rock-shaft consist of a crank disc fast on the rock-shaft and links pivoted to the levers and having lost-motion pivotal connections to said crank disc.

10. In a clutch controlling device, the combination of a frame, a clutch-controlling rock-shaft journaled in said frame, a screw journaled in said frame below and at right angles to said rock-shaft, a pair of non-rotatable traveling nuts bodily adjustable to different distances apart on said screw, a pair of levers pivotally suspended at their upper ends on said frame on opposite sides respectively of said rock-shaft, said levers having forked lower ends straddling said screw, a crank disc fast on said rock-shaft, links connecting said levers and crank disc, a pull spring connecting said levers, said screw and nuts operating said levers alternately against the pull of said spring, manually retractible spring-actuated locks normally holding said levers against movement by said spring, means for camming said locks out of the paths of said levers on the outward movement of the latter, and means for rotating said screw alternately in opposite directions.

ALEXANDER H. WILSON.